(12) United States Patent
Bolt (10) Patent No.: US 11,174,723 B2
(45) Date of Patent: Nov. 16, 2021

(54) METHOD FOR DETERMINING WELL DEPTH

(71) Applicant: DRILLER'S WAY-POINT DEPTH LIMITED, London (GB)

(72) Inventor: Harald Bolt, Minderhout (BE)

(73) Assignee: DRILLER'S WAY-POINT DEPTH LIMITED, London (GB)

(*) Notice: Subject to any disclaimer, the term of this patent is extended or adjusted under 35 U.S.C. 154(b) by 187 days.

(21) Appl. No.: 16/487,602

(22) PCT Filed: Feb. 22, 2018

(86) PCT No.: PCT/GB2018/000030
§ 371 (c)(1),
(2) Date: Aug. 21, 2019

(87) PCT Pub. No.: WO2018/154264
PCT Pub. Date: Aug. 30, 2018

(65) Prior Publication Data
US 2020/0056473 A1    Feb. 20, 2020

(30) Foreign Application Priority Data
Feb. 22, 2017   (GB) ................................. 1702825

(51) Int. Cl.
*E21B 47/09*   (2012.01)
*G01B 5/18*    (2006.01)
*E21B 47/07*   (2012.01)

(52) U.S. Cl.
CPC ............ *E21B 47/09* (2013.01); *E21B 47/07* (2020.05); *G01B 5/18* (2013.01)

(58) Field of Classification Search
CPC .......... E21B 47/04; E21B 47/07; E21B 47/09; G01B 5/18
(Continued)

(56) References Cited

U.S. PATENT DOCUMENTS 5,062,048 A * 10/1991 Coulter .................... G01B 7/26
                                                                          702/6
5,351,531 A * 10/1994 Kerr ........................ E21B 47/04
                                                                          324/206
(Continued)

FOREIGN PATENT DOCUMENTS

WO         2005033473          4/2005

*Primary Examiner* — Nimeshkumar D Patel
*Assistant Examiner* — Jean F Morello
(74) *Attorney, Agent, or Firm* — Duane Morris LLP; Gregory M. Lefkowitz (57) ABSTRACT

A method for determining along-hole well depth of a wellbore. A value for a calibrated drill string length is calculated, by determining length of drill pipe sections which form a drill string, prior to insertion of the drill pipe sections in the wellbore as part of the drill string. A correction which is calculated based upon one or more physical characteristics of the drill string. At least one of the physical characteristics is derived from measurements made at defined locations in the wellbore when the drill string is under tension whilst being pulled out of the wellbore. The correction to the calibrated drill string length is applied to obtain a value for a corrected drill string length as a measure of along hole depth. Advantageously, by calculating the correction based upon physical characteristics of the drill string associated with the process of pulling the drill string out of the well, the present invention reduces the number of physical characteristics which affect the correction.

24 Claims, 10 Drawing Sheets

(58) Field of Classification Search
USPC .................................................. 73/152.54
See application file for complete search history.

(56) References Cited

U.S. PATENT DOCUMENTS

| | | |
|---|---|---|
| 6,704,655 B2 | 3/2004 | Kelly |
| 7,047,653 B2 | 5/2006 | Fitzgerald |
| 7,114,579 B2 | 10/2006 | Hutchinson |
| 8,121,788 B2 | 2/2012 | Bordakov et al. |
| 8,442,769 B2 | 5/2013 | Phillips et al. |
| 2007/0131418 A1* | 6/2007 | Barrow .................. E21B 47/04 166/255.1 |
| 2009/0277686 A1 | 11/2009 | Hartmann et al. |
| 2009/0283323 A1 | 11/2009 | Quernheim et al. |
| 2011/0102188 A1 | 5/2011 | Mehta et al. |
| 2014/0353037 A1 | 12/2014 | Rasmus et al. |

* cited by examiner

METHOD FOR DETERMINING WELL DEPTH

CROSS-REFERENCE TO RELATED APPLICATIONS

This application is a § 371 national stage entry of International Application No. PCT/GB2018/000030, filed Feb. 22, 2018, which claims priority of United Kingdom National Application No. 1702825.9, filed Feb. 22, 2017, the entire contents of which are incorporated herein by reference.

INTRODUCTION

The present invention relates to a system and method for determining along-hole well depth and in particular measurements made by drill pipe or other tubulars (casing, tubing, sucker rods, coiled tubing, etc.) as commonly deployed in a well bore.

BACKGROUND TO THE INVENTION

Typically, a well is created by drilling a hole (wellbore) 5 cm to 1 meter (2 in to 40 in) in diameter into the earth with a drilling rig or similar such device. The drilling rig operates a drill string made up of drill pipes with a drill bit attached to the end which cuts into the earth. The drill string comprises a number of pipe sections which are connected together to lengthen the drill string as the drill bit cuts further into the earth. Drilling fluid, typically a fluid composition containing water or some other fluid and clay and/or other materials and chemicals, commonly known as "drilling mud", is pumped down the inside of the drill pipe and exits at the drill bit. The drilling mud is used to cool and lubricate the bit, lift rock cuttings to the surface, prevent destabilisation of the rock in the wellbore walls and overcome the pressure of fluids inside the rock so that these fluids do not enter the wellbore.

In the drilling operation, it is highly desirable to be able to accurately determine the position of the drill bit at the furthest extent of the hole and hence the length of the hole as well as being able to determine where events, such as geological boundaries, occur along the well bore. It is highly desirable to accurately determine the along-hole depth of the characteristics of the drilled well registered using measurement while drilling ("MWD") sensors and the along-hole position, or along-hole depth, at which formation characteristics are registered using logging while drilling ("LWD") sensors which detect and measure such events along the well bore. This is known as the measurement of along-hole depth. Increasing along-hole measurement accuracy decreases the uncertainty of the positional accuracy of the bit depth and such measurements.

Increased uncertainty in the along-hole depth determination leads to ambiguity and difficultly in ascertaining, for example, positional characteristics of the well bore as applied in well bore surveying, and also geological and reservoir descriptions as applied to modelling and asset value determination.

Along-hole depth is described by using calibrated lengths, typically identified as known lengths of drill pipe. This is referred to as "calibrated depth". If the calibrated depth is compensated for temperature, elastic stretch and other corrections, this is referred to as "corrected depth". If the corrected depth has an associated mathematical error so that the corrected depth can be expressed with given uncertainty, the depth is referred to as "true along-hole" ("TAH") depth.

Drill pipe length (so called "driller's depth") is a commonly used measurement that defines the along-hole depth of a well bore. Driller's depth is typically derived using the accumulated length of measured drill pipe sections (so called "pipe-tally") and is used to define the along-hole position of the bit and any associated subsurface sensors ("sensor depth"). The sensors are used in measuring the MWD characteristics of the drilled well and in measuring the LWD formation characteristics.

These sensors are typically positioned in the drill string near the drill bit in the so-called bottom hole assembly ("BHA"). The BHA is defined as the pipe assembly below the commonly used drill pipe and includes the drill bit. The sensors included in the BHA are located at a known distance from the drill bit ("sensor offset") defined by the physical arrangement of the BHA. The sensor depth is hence the driller's bit depth minus the sensor offset.

Driller's depth is defined while drilling. During drilling, the drill pipe may or may not be rotated, and may be in various states of tensional and compressional stress. Typical industry practice is that the depth is defined while drilling the well, with pipe lengths being added into the drill string as the drilling progresses. There may also be other factors such as hydraulic pressures, well bore frictional forces and pipe buckling along the well bore. These characteristics affect the effective length of the drill pipe from the surface to the bit.

It is known to apply corrections to the driller's depth values which include corrections for a variety of measurement and environmental influences. While drilling down, such corrections become extremely complex in their nature and application because they take into account numerous factors that affect drill pipe length as the well is being drilled.

The accuracy of driller's depth measurement is a typical limitation on the accuracy of the measurement of the along-hole depth of the rock face position and the associated corresponding sensor depths.

Several examples of the state of the art have been identified.

U.S. Pat. No. 6,704,655 B describes a method and apparatus for correcting the depth index for well-log data using wireline measurements.

CA Patent CA2482931C describes a method for improving drilling depth measurements during downward drilling, with correction applied while increasing depth.

U.S. Pat. No. 8,121,788 B2 describes a method and system to automatically correct LWD depth measurements which also focusses on downward drilling.

US Patent Application 20100307742A1 describes a method of determining and utilizing high fidelity wellbore trajectory. The method is focussed on ancillary measurement and relates to automated depth compensation apparatus while drilling down.

U.S. Pat. No. 7,047,653 B2 describes wireline depth correction in which tension is computed rather than measured and is focussed on wireline, a different measurement methodology.

SUMMARY OF THE INVENTION

In accordance with a first aspect of the invention there is provided a method for determining along-hole well depth of a wellbore, the method comprising the steps of: calculating a value for a calibrated drill string length, by determining length of drill pipe sections which form a drill string, prior to insertion of the drill pipe sections in the wellbore as part of the drill string;

calculating a correction which is calculated based upon one or more physical characteristics of the drill string wherein, at least one of the physical characteristics is derived from measurements made at defined locations in the wellbore when the drill string is under tension whilst being pulled out of the well bore; and applying the correction to the calibrated drill string length to obtain a value for a corrected drill string length as a measure of along hole depth.

Advantageously, by calculating the correction based upon physical characteristics of the drill string associated with the process of pulling the drill string out of the well, the present invention reduces the number of physical characteristics which affect the correction. A drill string when being pulled upwards from a lower station to a higher station in the well bore is under tension.

Preferably, the along-hole depth is measured with respect to a surface reference point, or so called zero depth point (ZDP). The ZDP is typically, but not exclusively, the so-called rig-floor or some other defined point typically used during well bore operations. This ZDP is referenced to a reference point that has known or accepted locational identification.

Preferably, the reference point is at or near the rig from which the drill pipe is being inserted into the hole.

Preferably, the drill string is connected to a BHA.

Preferably, the measurement is made at a repeatable distance interval.

Preferably, the repeatable distance interval is one length of drill pipe or a multiple thereof or a similar length.

Preferably, the defined locations, or so-called "measurement stations", are determined by the number of pipe sections contained within the drill string which define the length of drill pipe.

Preferably, the one or more physical characteristic related to correction is thermal expansion in the drill string.

Preferably, BHA temperature values are measured by a temperature sensor.

Preferably, BHA temperature values are estimated from known or assumed data.

Preferably, the temperature sensor used for BHA temperature measurement is located on the bottom hole assembly usually as part of the MWD or LWD sensor package.

Preferably, the correction applied to the drill string length to obtain the actual drill string length is corrected for thermal expansion.

Preferably, the thermal expansion is calculated using temperature values measured or estimated at a plurality of locations along the hole.

Preferably, the thermal expansion is calculated by measuring the temperature of a plurality of drill pipe sections and comparing these temperatures to the temperatures of the corresponding drill pipe sections prior to insertion of the drill pipe sections in the wellbore.

Preferably, this step of measuring the thermal expansion comprises comparing the temperature at one defined location to the temperature at another defined location and using differences in the temperatures measured at said locations to calculate pipe elongation due to temperature compared to a calibration temperature such that the differences add up to give the total thermal expansion correction of the drill pipe in the well.

Preferably, tension and temperature measurements may be obtained directly from the drill pipe when so-called "wired pipe" is in use and either or tension and in temperature information is available along the length of the drill pipe. The location of the wired pipe sensors then provides the calibrated depth at which the correction is assessed.

Preferably, the correction values are determined at a plurality of stations and a between stations correction values is determined, the total correction is a total of the station correction values and the between stations correction values.

Preferably, the one or more physical characteristic related to correction is elastic stretch in the drill string.

Preferably, the step of calculating a correction factor comprises determining the surface weight of the BHA.

Preferably, the surface weight of the BHA in mud is determined or is estimated.

Preferably, the step of calculating a correction comprises measuring the length of the drill pipe sections, in an unstretched and relaxed state, or at a known and reported tension or compression, to provide a drill pipe section length prior to insertion of the drill pipe sections in the well.

Preferably, the surface weight of the drill string is measured at stations.

Preferably, the surface weight of the drill string is measured while running in hole at measurement stations by briefly pulling out of hole (POOH) through the station.

Preferably, the surface weight of the drill string is measured at measurement stations after drilling when the drill string is being pulled out of the hole (POOH).

Preferably, the surface weight measurement is measured while pulling the drill string out of the hole at a same constant speed.

Preferably, measurements of the surface weight of the drill string are used to create a plot of surface measured tension against drill pipe depth used to provide the correction factor.

Preferably, the calculation of the correction comprises measuring the tension of the drill pipe at measurement stations and comparing these to the tension or compression state as defined in measurement of the drill string length prior to insertion of the drill pipe sections in the well.

Preferably, the step of calculating the elastic stretch comprises determining the surface weight of the drill string for a plurality of drill string lengths at defined measurement station locations in the well bore.

Preferably, the step of determining the elastic stretch in the drill string comprises, for a plurality of drill string lengths measuring tension at one defined location and at another defined location and using the totalized incremental tension difference to calculate total elastic stretch correction for the drill string.

Preferably, the surface weight of the drill string ("surface hook load") is measured during the running in the hole (RIH) operation at measurement stations where the drill pipe is pulled out of hole at known and the same constant speed.

Preferably, the method further comprises measuring the drill pipe tension such that the speed at which the drill pipe tension is measured at each measurement station the subsurface sensor measurements of the MWD and/or LWD sensors can be registered to ascribe a meaningful response of the subsurface characteristics to the drill pipe length as described at surface.

Preferably, the MWD and/or LWD sensor responses are registered ("logged") to the actual drill pipe length identified as the drill pipe is withdrawn from the well.

Preferably, the repeatable distance includes a recording of the MWD and/or LWD sensors so that these can be correlated to the depth measurement value determined.

BRIEF DESCRIPTION OF THE DRAWINGS

The present invention will now be described with reference to the accompanying drawings in which.

DETAILED DESCRIPTION OF THE DRAWINGS

The present invention provides a method and system for determining the along-hole well depth by applying a correction to a predetermined drill pipe length value based upon the total calibrated length of pipe which has been fed into a well. The present invention uses the fact that, when the drill string is raised during the pulling out of the hole operation used so-called simple sliding state, the compression-tension regime of the drill pipe is reduced to tension only, greatly simplifying the calculation of a correction. In the tension only regime, there are no effects due to translation from rotation to sliding because the pipe is sliding only. In addition, because the hydraulic pressure of the pipe is relaxed, there are no further influences on the pipe and mud buoyancy seen as an effect that is reflected in the surface weight. Similarly, frictional forces are acting in one direction only, simplifying the correction characteristics such that incremental elastic stretch correction for any interval between any two measurement stations can be calculated by considering the changes in surface tension ("surface hook load"), between any two particular measurement stations.

These measurements may also be available when using so called "wired pipe" using the temperature and or tension information along the pipe being measured. The measured tension and or temperature information can be applied to the correction using the relationship described when the pipe is being pulled up out of the hole (POOH).

Therefore, an accurate correction may be calculated through summing the individual thermal and elastic stretch effects.

The method accounts for thermal expansion and elastic stretch in such a way that the correction need not take into account factors such as buoyancy, hydraulic pressure, torque, compression, pipe buckling, pipe drag and other effects prevalent while drilling.

Typical industry practice is that the depth is defined while drilling into the well, with pipe lengths being added into the drill string as the drilling progresses. In contrast, the method of the present invention is used when the pipe is being pulled out of the well either continuously or when even momentarily pulled up while running into the well such that physical characteristics, such as the surface hook-load, BHA temperature and MWD/LWD sensor responses are registered.

Thermal Correction

The thermal coefficient for drill pipe (Alloy steel) is a constant related to the material properties of steel and is usually given as being at or around 8E-06/degF or 11E-06/degK. Other drill pipe materials have different thermal expansion coefficients.

The general equation for thermal expansion is given as:

$$\Delta l = \alpha L_0 \Delta t$$

where
$\Delta l$=expansion (m, inches)
$L_0$=length of pipe (m, inches)
$\Delta t$=temperature difference (degK, degF)
$\alpha$=linear expansion coefficient (m/m degK, in/in degF)
www.engineeringtoolbox.com/linear-expansion-coefficients accessed December 2016)

When applied to drill pipe being run in hole, the elongation of the pipe due to temperature is the summation of the temperature expansion of each section of pipe applied along the length of pipe in the well. This is considered over sections of the well defined by "top" ("$_{top}$") and "bottom" ("$_{btm}$") of each section identified by the calibrated length of drill pipe. The total summation is the total temperature effect on drill pipe.

Per section of pipe, the expansion is defined by the following relationship:

$$Th.Corr = \sum_{TID}^{measured\ depth} \left( \left( \left( \frac{(BHT_{top} + BHT_{btm})}{2} \right) - T_{cal} \right) \times L_{cal} \times C_{therm} \right)$$

Where
Th.Corr=thermal expansion correction over the drill pipe length being considered measured depth=depth from which the correction is being calculated
TID=tie-in depth, or the reference depth to which the calculation is being considered, usually being surface or ZDP
$BHT_{top}$=subsurface temperature at top station
$BHT_{btm}$=subsurface temperature at bottom station
$T_{cal}$=temperature of pipe during length calibration
$L_{cal}$=drill pipe length defined by calibrated pipe length between measurement stations
$C_{therm}$=thermal expansion coefficient of drill pipe over the drill pipe length being considered Elastic Stretch Correction The elastic stretch coefficient for drill pipe is a material property related to the Young's Modulus for steel and the cross sectional area of the drill pipe. Hence it is also a constant over the length of any similar drill pipe. Variances due to pipe condition can be incorporated, but for all practical purposes are usually considered minimal. Variances due to temperature in the stretch coefficient are minimal over the temperature ranges typical in the industry.

$$Stress = strain = F/A = \Delta L/L_0$$

$$Stress/strain = (F/A)/(\Delta L/L_0) = \gamma$$

where
F=force applied along the pipe,
A=cross sectional area of the pipe (outside diameter area−inside diameter area),
$\Delta L$=is the resulting elongation, or elastic stretch,
$L_0$=untrained length of material,
$\gamma$=Young's Modulus=stress/strain.

For steel, as commonly used in drill pipe, $\gamma$=Young's Modulus=20 E10 N/m². Other materials may have different Young's Modulus values, in which case these should be used for those materials. The stretch coefficient applicable to drill pipe is a function of the pipe cross sectional area. This cross sectional area is directly proportional to the nominal drill pipe weight.

The stretch coefficient for drill pipe can then be assessed as being:

$$St.Coeff = 1/(\gamma^* A) = k/(\gamma^*(\pi r_{od}^2 - \pi r_{id}^2, in^2)) = k'/(\gamma^*(D_{od}^2 - D_{id}^2, in^2))$$

where
St. Coeff=stretch coefficient
$r_{od}$=outside radius of the drill pipe,
$r_{id}$=inside radius of the drill pipe
$D_{od}$=outside diameter of the drill pipe,
$D_{id}$=inside diameter of the drill pipe
k, k'=units constant
(from: http://physics.doane.edu/hpp/Resources/Fuller3/pdf/F3Chapter_13.pdf, accessed December 2016)

Because drill pipe cross sectional area is directly proportional to drill pipe weight (typically 1 lb/ft=0.0843 in²), the St.Coeff can be expressed as:

$$St.Coeff = 1/(\gamma^* A) = k''/(\gamma^* pipe\ weight, lbs/ft)$$

where
k"=units constant

In the case of composite drill pipes where different drill pipe types and sizes are used, the same principles apply albeit with those specific characteristics applied to the pipe lengths as they are measured.

Drill pipe when withdrawn from the well is subject to tensional force exerted at the travelling block where the tension is measured ("surface hook load"). This drill pipe, as withdrawn from the well, is subject to strain, and hence elastic elongation. This elongation can be corrected for using a stretch calculation relationship, then applied over the individual lengths of pipe between measurement stations. In this case, the summation of the individual elastic stretch elements over the lengths of pipe between measurement stations is then the total elongation of the drill pipe string between where the pipe tension is being measured and the top of the BHA. By convention, the tension value and length values and subsurface MWD and/or LWD sensor responses are assessed at finite drill pipe positions identified as the drill pipe passes through the ZDP.

This leads to the following relationship for drill pipe elastic stretch correction:
where $$St.Corr = \sum_{TID}^{measured\ depth} \left( \left( \left( \frac{(Surf.Ten_{top} + Surf.Ten_{btm})}{2} \right) - Ten_{cal} \right) \times L_{calt} \times C_{stretch} \right)$$

St. Corr=elastic stretch correction
measured depth=depth from which the correction is being calculated
TID=tie-in depth, or the reference depth to which the calculation is being considered, usually being surface or ZDP
$Surf.Ten_{top}$=surface hook load during pull out of hole (or equivalent) at the top station being considered measured at a constant speed,
$Surf.Ten_{btm}$=surface hook load during pull out of hole (or equivalent) at the bottom station being considered measured at a same constant speed,
$Ten_{cal}$=tension of drill pipe during calibration (usually =0),
$L_{cal}$=drill pipe length including thermal correction defined by calibrated pipe length between measurement stations,
$C_{stretch}$=stretch coefficient of drill pipe ($=\gamma/A$).

A preferred embodiment of the invention includes measuring the drill string length at predefined locations referred to as stations while pulling out of hole and defining the correction applicable to the measurement based on the differences of measurement characteristics compared to those determined for other measurement station.

In this case, a number of measurements are made, including:
the length of the drill pipe sections which form the drill string;
the drill pipe surface tension ("surface hook load");
surface and bottom hole temperatures;
the MWD and/or LWD sensor responses;
the length of each drill string, the temperature at which the measurement was made and the tension or compression state of the pipe which represents that calibrated length of drill pipe. The measurement method used is described, including the errors associated with the measurements made.

The surface weight is measured by assessing the travelling block surface hook load or such practices to arrive at a tension on the drill string at surface.

The total force pulling on the hook ("surface hook load" or "surface tension"). This total force includes the weight in drilling mud of the drill string, the drill collars and any ancillary equipment, reduced by or increased by any force that tends to affect that measured weight. Some forces that might affect the weight include friction along the wellbore wall (especially in deviated wells) and, importantly, buoyant forces on the drill string caused by its immersion in drilling fluid.

The measurements are made traceable to a recognized industry measurement standard (e.g. International Bureau of Weights and Measures (BIPM), Sevres, France).

In order to calculate a correction at each selected station, the surface tension of the suspended pipe is measured, and the surface and BHA temperature is measured while pulling out of hole. During these station measurements, the MWD and/or LWD measurements are made, these recording the subsurface responses of the instrumentation against the apparent drill pipe length value that is current at the time of measurement. These measurements are noted against the pipe tally. The measurement method used is described, including the errors associated with the measurements made.

A recording is made of exactly when the identified drill pipe length comes through the ZDP, exactly defining the pipe tally to the surface tension ("surface hook load") profile of the drill pipe string, the temperature profile of the drill pipe string and subsurface MWD and/or LWD sensor responses.

The values for the thermal correction and then the additional elastic stretch are calculated between station measurement points. These values are added to the pipe tally to give corrected depth applicable to the deepest station measured.

The MWD and/or LWD responses logged while pulling out of hole at each measurement station defined by the calibrated drill pipe length adjusted for the BHA length and the sensor offset are now temperature and elastic stretch corrected, and can be defined as "Corrected Depth". By accounting for the associated measurement errors and assigning an uncertainty to each station defined corrected depth, then the measurement is referred to as "True Along-Hole" depth.

Figure 1:
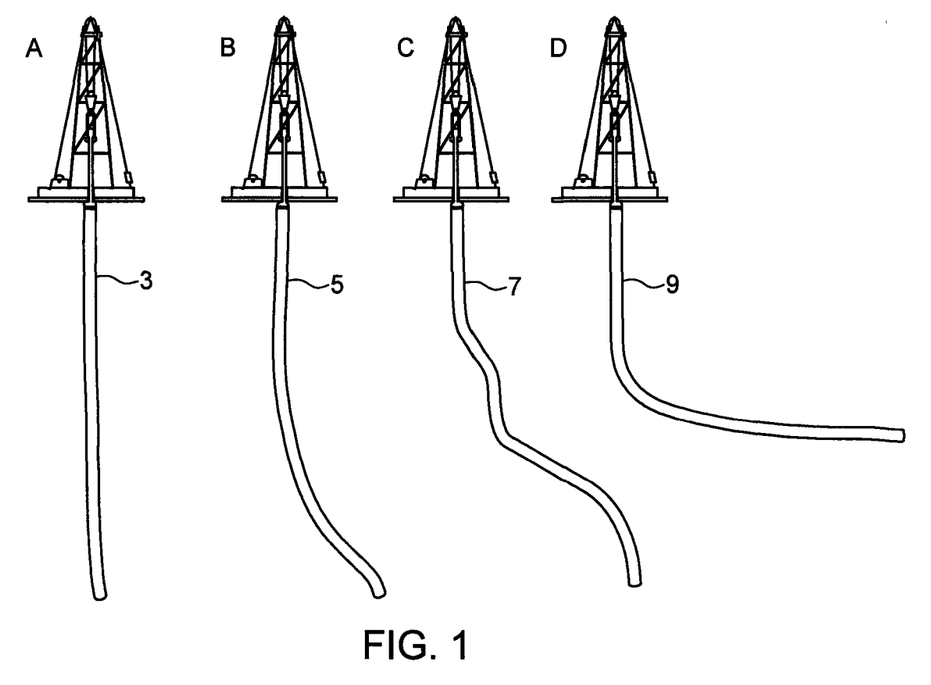
FIG. 1 is a schematic diagram which illustrates four wells drilled to the same vertical depth, each with a different profile to which an example of the method and system of the present invention is applied.

Referring now to FIG. 1, a schematic illustration 1 of four different types of well, as drilled to the sane vertical depth. A is a straight well 3, B is a slightly deviated well 5, C is a corkscrewed "S" profile well 7 and D is horizontal well 9. The along-hole depths of A, B and C are almost the same, while well D has a horizontal length that makes the vertical depth the same but the along-hole depth different.

Figure 2:
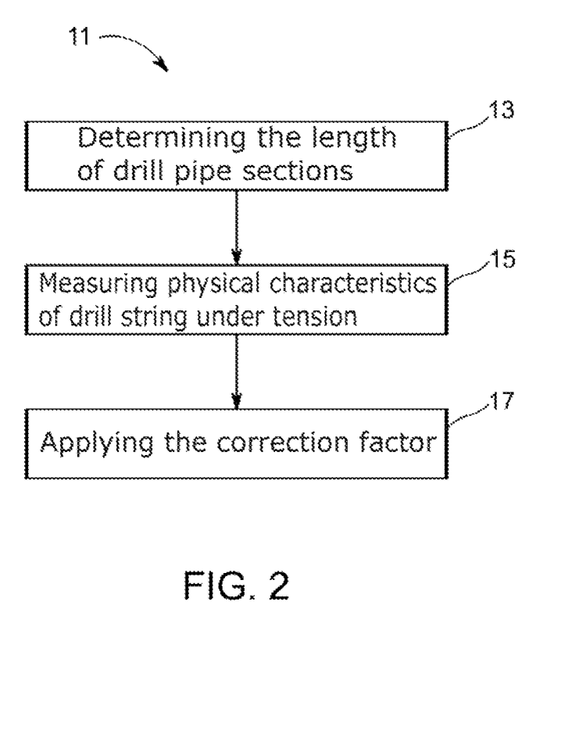
FIG. 2 is a flow chart illustrating the main features of an example of a method in accordance with the present invention.

FIG. 2 is a flow diagram illustrating the main features of an example of a method in accordance with the present invention.

The method 11 comprises calculating a value for a calibrated drill string length when the drill string is extending from a rig into the well bore, by determining the length of drill pipe sections which form the drill string, prior to insertion of the drill pipe sections in the well as part of the drill string 13.

Calculating a correction factor which is applied to the value for drill string length, the correction factor being calculated based upon one or more physical characteristics of the drill string wherein at least one of the physical characteristics is derived from measurements made when the drill string is under tension whilst being pulled out of the well bore 15 at a constant speed and applying the correction factor to the value for a calibrated drill string length 17.

Figure 3:
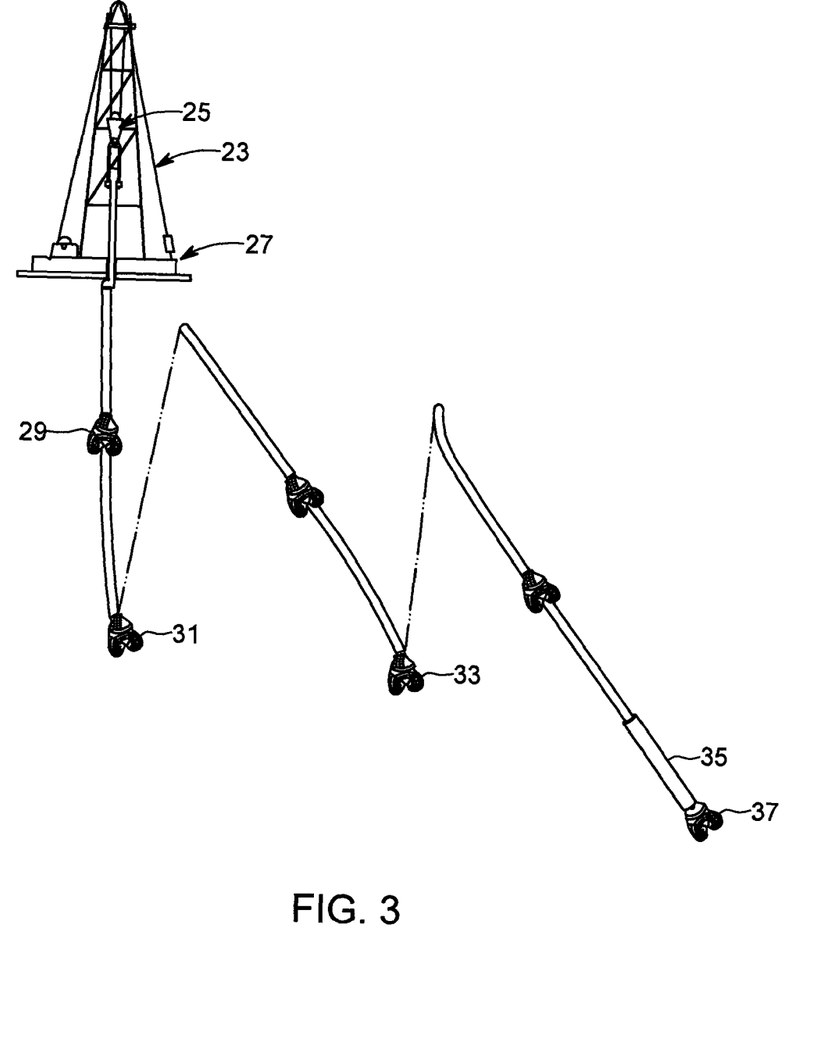
FIG. 3 is a schematic diagram which illustrates how measurements are taken at a number of measurement stations while pulling the pipe string out of hole.

FIG. 3 is a schematic diagram 21 which illustrates the different station measurements taken at various points along each well bore. It shows a rig 23 with a surface hook load measurement means and travelling block 25 above the surface with the reference point referred to as the zero point depth 27 shown. A number of measurement stations 29, 31, 33 are shown along with the bottom hole assembly 35 and the drill bit 37.

In use, where the surface drill pipe tension, represented by the surface hook load of the travelling block 25 (so, excluding the weight of the travelling block) is measured while pulling out of hole at a constant speed. The speed at which the drill pipe is pulled out is such that the subsurface sensor measurements can be provided simultaneously. The exact time of the pipe tally joint representing the station depth is noted. This is compared to the MWD and/or LWD sensor responses to pinpoint the corresponding subsurface event response of the instrumentation.

The surface tension, surface mud temperature and BHA measured temperature are noted at each measurement station as the measurement point passes the ZDP 27 and noted against the pipe tally. The measurement can be made either while running in hole with a drill string and then stopping at each station and performing the measurement while pulling out of hole at a constant speed, or can be made during the POOH to surface at each station point at a same constant speed.

Figure 4:
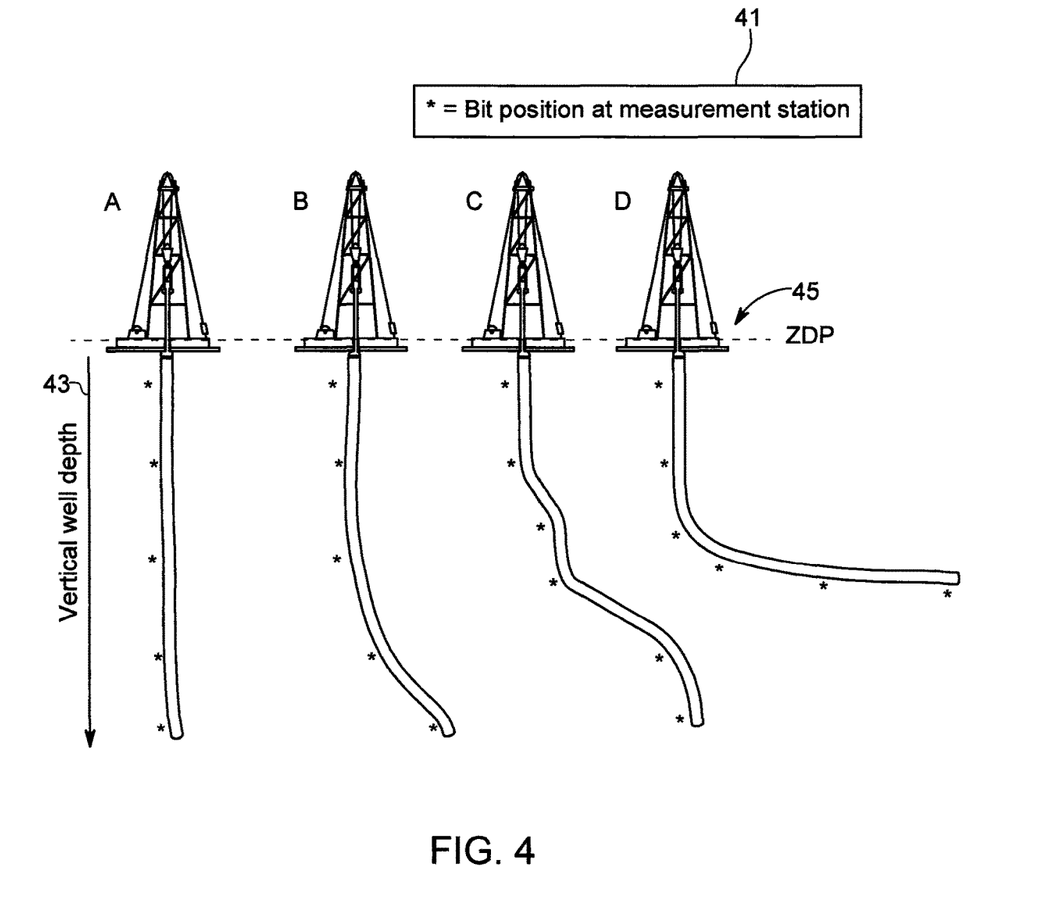
FIG. 4 is a schematic diagram which illustrates the different station measurements taken at various points along each well bore.

FIG. 4 is a schematic diagram 41 which illustrates the different station measurements taken at various points along each well bore for wells 3, 5, 7 and 9 of FIG. 1 at a range of vertical well depths 43. It represents the various stations where POOH surface tension is measured how these compare between the various example wells.

Figure 5:
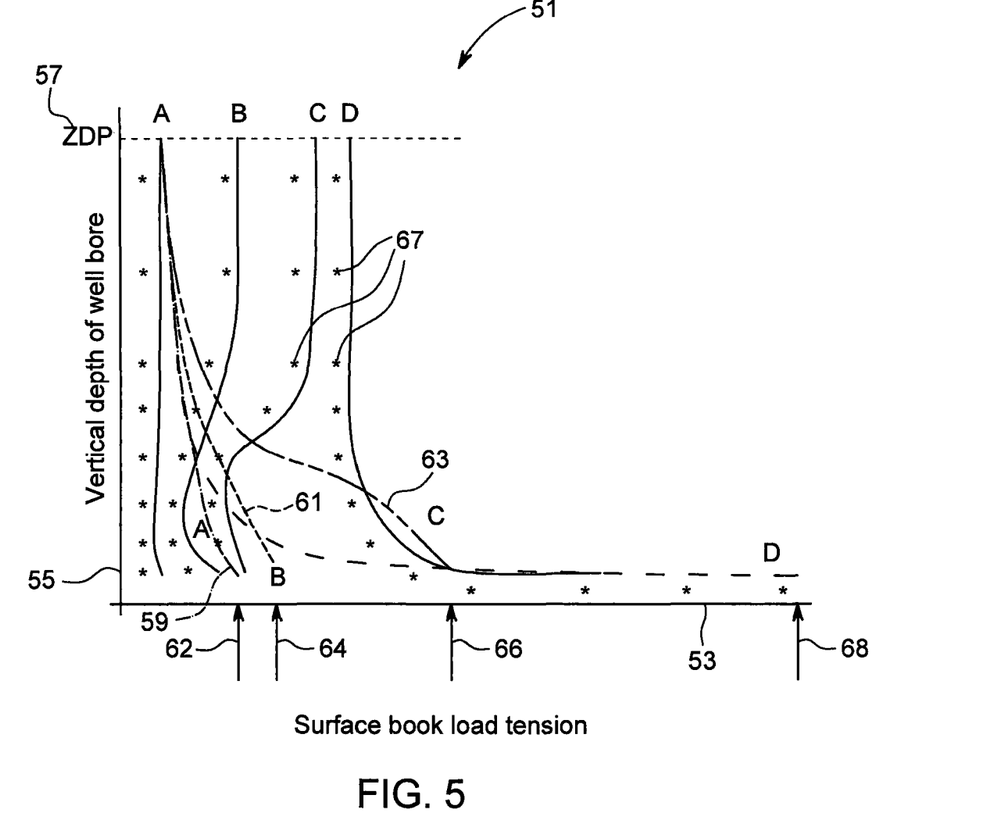
FIG. 5 is a schematic diagram which illustrates possible surface hook load tension readings during the POOH station measurements.

FIG. 5 is a schematic diagram 51 which illustrates possible surface hook load tension readings during POOH station measurements. FIG. 5 shows on its X-axis the surface load tension 53 and vertical well depth on its Y-axis 55. Zero point depth 57 is shown and values for surface hook load 59, 61, 63, 65 are shown for drill strings in well bores 3, 5, 7 and 9 respectively. It shows the various stations 67 where bit position is during the POOH surface hook load tension measurements are made, and how these compare between the various example wells. The maximum tension for each well is identified on the X-scale for drill strings in well bores 3, 5, 7 and 9 respectively at points 62, 64, 66 and 68 respectively.

Figure 6:
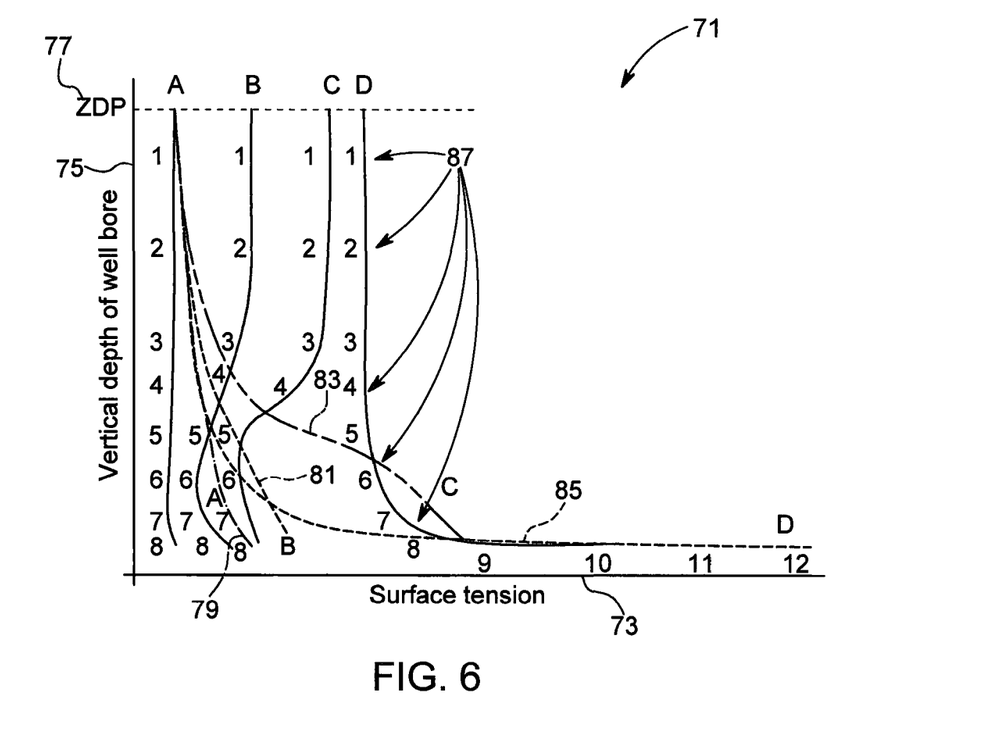
FIG. 6 is a schematic diagram which illustrates these station measurements now labelled so that they can be identified and analysed.

FIG. 6 is a schematic diagram 71 which illustrates these station measurements labelled so that they can be identified and analysed. It shows a graph of surface tension 73 on the X-axis and depth on the Y-axis 75 with the zero point depth 77 shown. FIG. 6 represents the various possible station measurement point surface hook load tension measurements as portrayed in FIG. 5 and labelled so that they can be analysed using the method described. The measured surface tension for drill strings in well bores 3, 5, 7, and 9 of FIG. 1 are shown in curves 79, 81, 83 and 85 respectively.

Figure 7:
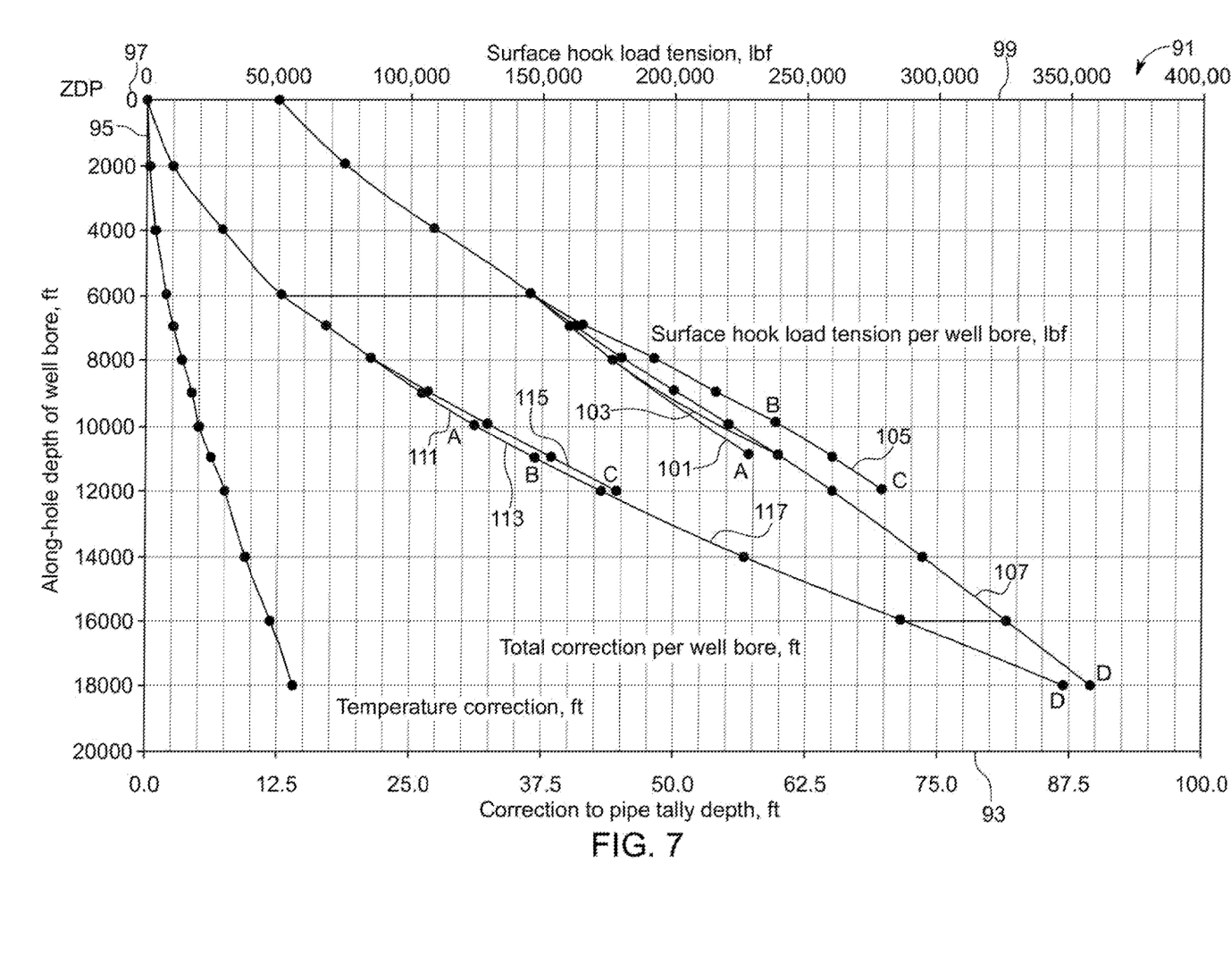
FIG. 7 is a graph of possible surface hook load tension plotted against the along-hole depth, and the corresponding thermal correction and total correction then applicable to the different well types as calculated using the method described for an assumed drill pipe specification.

FIG. 7 is a graph 91 of the surface hook load tension 99 plotted against the along-hole depth 95, and the corresponding thermal correction and total correction applicable to the different well types 93 as calculated using the method of the present invention. It shows curves which represent surface hook load tensions 101, 103, 105 and 107 and curves which represent the total correction 111, 113, 115 and 117 for drill strings in the well bores 3, 5, 7, 9 respectively. These corrections are summed and applied to the pipe tally depth to arrive at a corrected drill pipe along-hole depth. This depth may be referred to as "Corrected Depth".

At each station, a corresponding uncertainty is assigned to the pipe tally measurement, the thermal correction and the elastic stretch correction and the uncertainty parameters inherent in these measurements and the associated parameters. These uncertainties expressions per station may be summed such that the total uncertainty expression represents the uncertainty of the depth measurement that has now been thermally and elastic stretch corrected, and can be assigned the name "True Along Hole" (TAH") depth.

Figure 8:
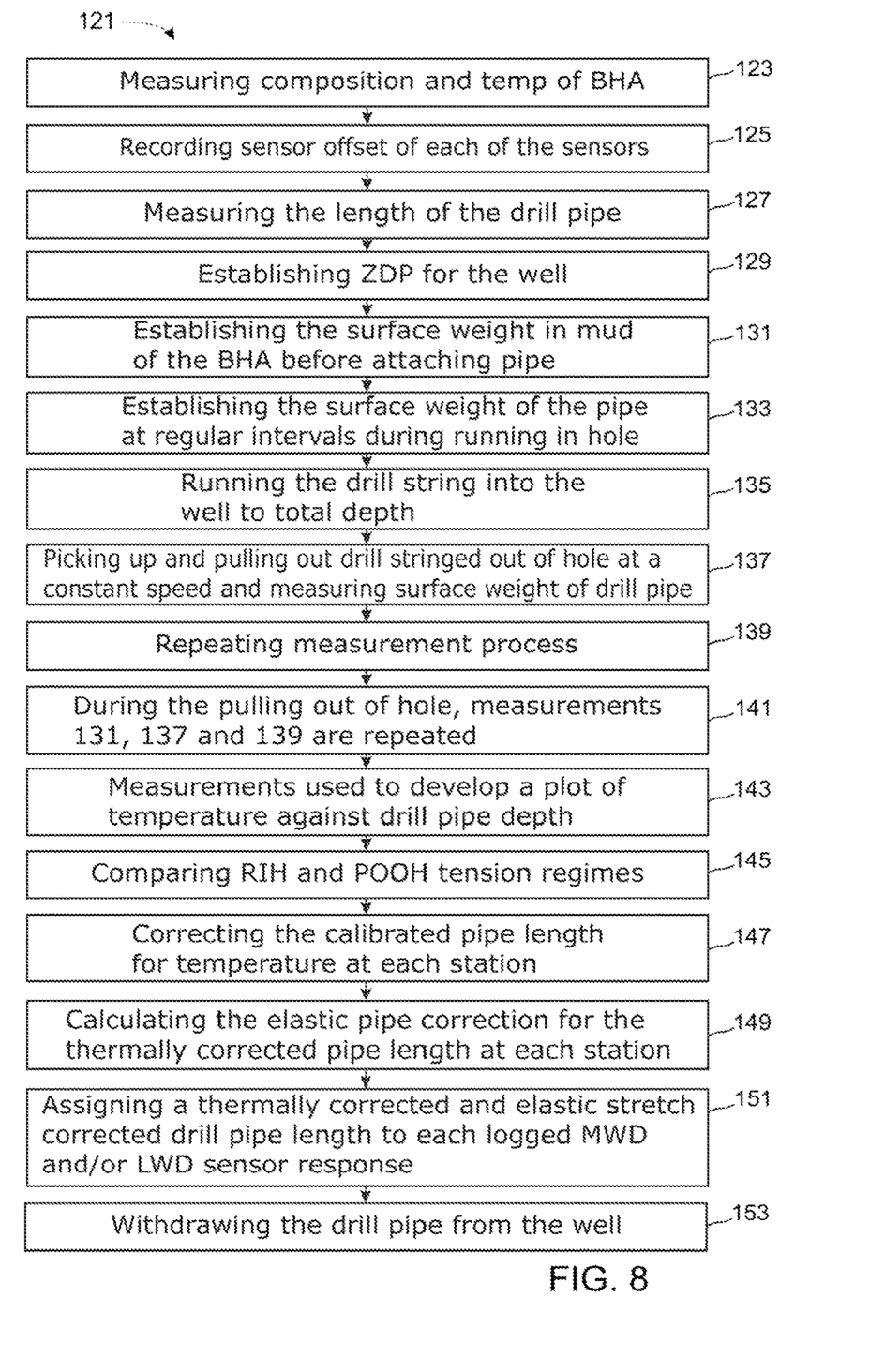
FIG. 8 is a flowchart showing the method steps of another example of the present invention.

An example of the present invention will be described with respect to the method steps 121 set out below and with respect to FIG. 8.

(123) The composition of the BHA is measured and the temperature of the BHA at the time of measurement to determine composed length characteristics.

(125) The sensor offset of each of the sensors is recorded, these being the position of the effective measure points as defined by the sensor suppliers.

(127) The length of the drill pipe is measured or measured at a known tension, usually being an un-stretched and relaxed state. This measurement is referred to as the calibrated drill pipe length. Each drill pipe length is noted and identified against the individual drill pipe measured. This is commonly applied practice in defining the "pipe tally". Additionally, the ambient temperature of the drill pipe is noted at the time of measurement. An uncertainty for this measurement is provided.

(129) The ZDP for the well is established. An appropriate calculation for bit depth and each MWD and LWD sensor offset is determined when running the BHA into the well bore based on the length of the BHA from the ZDP.

(131) The surface weight ("surface hook load") in mud of the BHA before attaching the drill pipe is established. The surface mud temperature is noted and compared to the BHA mud temperature for verification. An uncertainty term for both of these measurements is provided.

(133) The surface weight ("surface hook load") of the drill pipe at regular intervals defined by the pipe tally during the running in hole of the drill pipe is established. Each of these measurements is called a measurement station, but the surface weight ("surface hook load") measurement is made while pulling out of hole at a same constant speed. The measurement is made over a distance that is repeatable, for example over 1-length of drill pipe. The pipe tally distance over which the measurement is made is recorded. The interval over which station is taken is noted in terms of driller's pipe depth. The constant speed is arranged so that it allows for data acquisition by the MWD and/or LWD instrumentation that is able to record formation or other well bore characteristics. The BHA temperature is noted. The surface mud temperature may be noted if it is known or suspected to be changed. An uncertainty term for each of these measurements is provided. The responses from the MWD and/or LWD sensors against pipe tally depth while pulling out of hole are noted.

(135) The drill string is run into the well to total depth ("TD"). At TD drilling is commenced.

(137) After drilling a certain amount, the drill string is picked up and pulled out of hole at a defined same constant speed. A station measurement is made as described #6 above, recording the surface weight ("surface hook load") of the drill pipe is measured while pulling out of hole as per #6 above while pulling out of hole at a same constant speed. The pull out of hole is done at a constant speed that allows for data acquisition by the MWD and/or LWD instrumentation. The BHA temperature is noted. The surface mud temperature may be noted if it is known or suspected to be changed. An uncertainty term for these temperature and weight measurements is provided. The responses from the MWD and/or LWD sensors against pipe tally depth while pulling out of hole are noted.

(139) The measurement process #8 is repeated at required intervals during further drilling operations. The measurements made while running in hole (#6) and then further made at intervals while drilling (#8 & #9) are referred to as the RIH measurements.

(141) When drilling has been stopped, the drill pipe is withdrawn from the well.

During the pulling out of hole, at the drill pipe length intervals identified in #6, #8 and #9 the surface weight and temperature measurements and MWD and/or LWD measurements are repeated. These are referred to as the POOH measurements.

(143) The measurements are used to develop a plot of temperature against drill pipe depth. This is referred to as the temperature regime. The measurements are used to develop a plot of surface measured tension against drill pipe depth. This is referred to as the tension regime.

(145) The RIH and POOH tension regimes established are compared. If the two are similar and within stated measurement error tolerances, they can be used to define drill pipe depth corrections applicable to the pipe tally at those stations.

(147) At each station the calibrated pipe length, as defined by the pipe tally, is corrected for temperature. This is done be comparing the temperature to the previous BHA registered temperature and adding the incremental temperature difference induced pipe elongation due to temperature. These increments add up to give the total thermal expansion correction of the drill pipe in the well.

(149) At each station, the elastic pipe correction is calculated for the thermally corrected pipe length. This is calculated as an increment from the surface weight ("surface hook load") values at the last station. The increments form the elastic stretch profile for the drill pipe, and are used to develop the elastic stretch correction for the various stations at which tensions have been measured. The total of these corrections represents the total elastic stretch correction for the drill pipe in the well applicable to the station measurements.

(151) A thermally corrected and elastic stretch corrected drill pipe length is assigned to each logged MWD and/or LWD sensor response. The pipe tally defined points of each station are taken as the depth correlation points.

(153) The drill pipe is withdrawn from the well. At surface the drill pipe recorded depth is compared to the originally recorded depth at the top of the BHA. The surface weight of the BHA is compared to the BHA weight recorded originally for verification.

Interpolations at any point between measurement stations may be incorporated herein without deviating from the scope of the invention.

Figure 9:
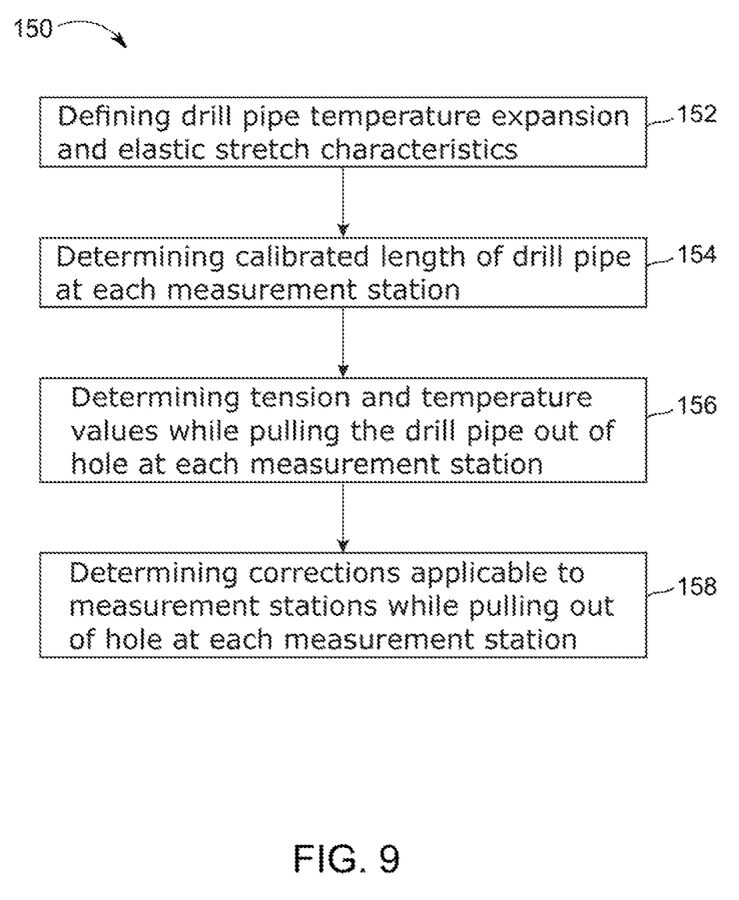
FIG. 9 is a flowchart which describes the process of determining corrections applicable to measurement stations in an example of the present invention.

FIG. 9 is a flowchart which describes the process of determining corrections applicable to measurement stations in an example of the present invention.

Define drill pipe temperature expansion and elastic stretch characteristics 152.

Determine calibrated length of dill pipe at each measurement station 154.

Determine tension and temperature values while pulling the drill pipe out of hole at each measurement station 156.

Determine corrections applicable to measurement stations while pulling out of hole at each measurement station 158.

Figure 10:
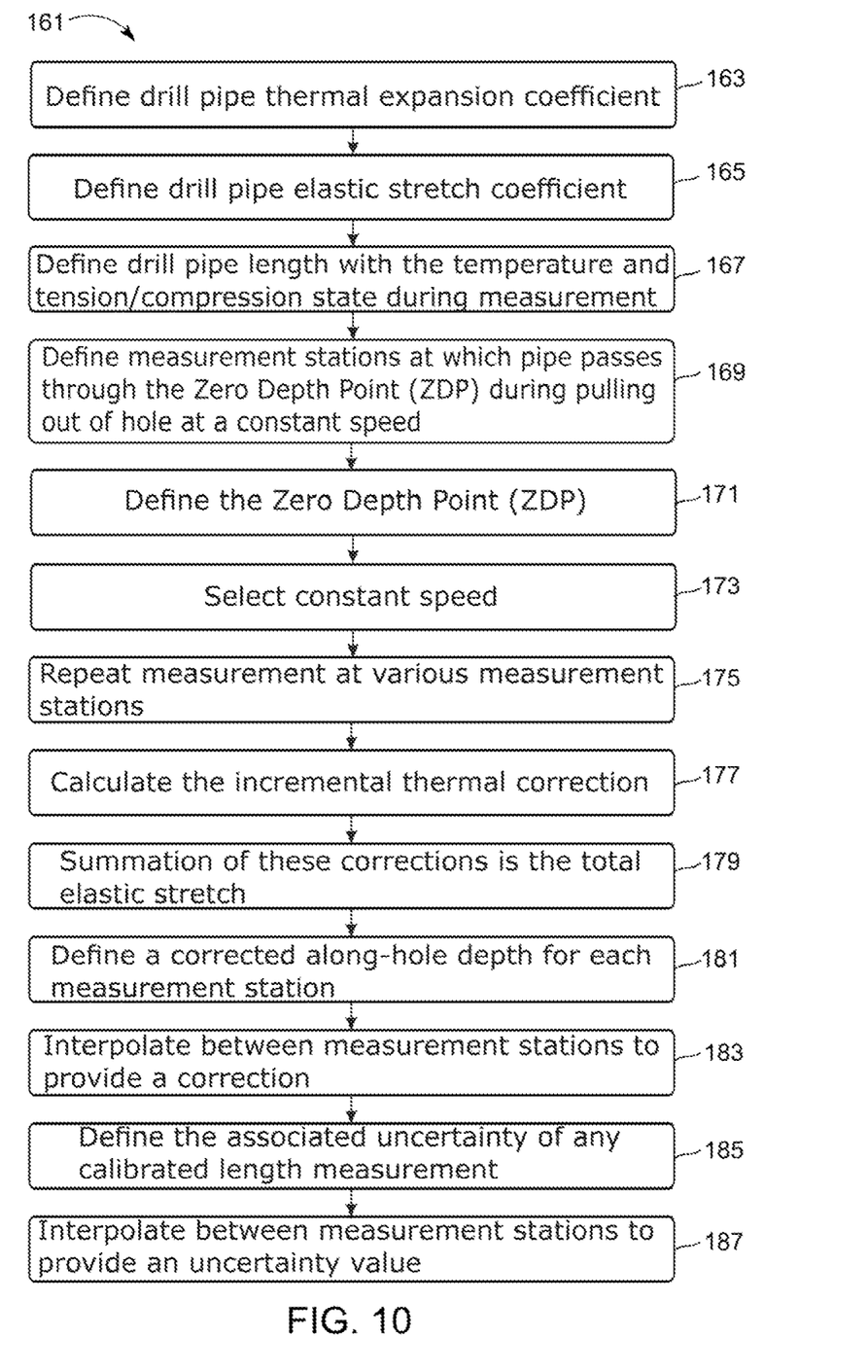
FIG. 10 is a flowchart which shows a detailed workflow of how the process might be applied during operations.

FIG. 10 is a flow chart 161 which describes another embodiment of the present invention.

Define drill pipe thermal expansion coefficient 163.

Define drill pipe elastic stretch coefficient 165.

Define drill pipe length with the temperature and tension/compression state during measurement 167.

Define measurement stations at which full lengths of drill pipe, or calibrated drill pipe length, passes through the Zero Depth Point (ZDP) during pulling out of hole at a constant speed 169.

Define the Zero Depth Point (ZDP) 171.

Measure the surface hook load tension and mud temperature while pulling out of hole at a same constant speed while pulling the BHA out of hole. This is the first measurement station, and is the point being the start of the drill string. The constant speed is selected such that the MWD and LWD measurements can be made giving adequate measurement resolution for along-hole depth correlation 173.

Repeat this measurement at various measurement stations defined by calibrated lengths of drill pipe as may be appropriate to the drilling operation and the measurement accuracy requirements 175.

At each measurement station, calculate the incremental thermal correction based on the temperature gradient along the well bore over from the BHA to the ZDP. The summation of these corrections is the total thermal correction 177.

At each measurement station, use the thermally corrected length and the tension differential to the last station to define the incremental elastic stretch applicable to the drill pipe compared to the previous station. The summation of these corrections is the total elastic stretch 179.

Apply the combined thermal and elastic stretch correction to provide a total correction now applicable to the calibrated length to define a corrected along-hole depth for each measurement station 181.

Interpolate between measurement stations to provide a correction applicable to any point in between as being the corrected along-hole depth 183.

Define the associated uncertainty of any calibrated length measurement and any correction per measurement station to provide true along-hole (TAH) depth 185.

Interpolate between measurement stations to provide an uncertainty value at any point in between measurement stations as being the uncertainty of the along-hole depth measurement 187.

Improvements and modifications may be incorporated herein without deviating from the scope of the invention.

The invention claimed is:

1. A method for determining along-hole well depth of a wellbore, the method comprising the steps of:
    calculating a value for a calibrated drill string length, by determining length of drill pipe sections which form a drill string, prior to insertion of the drill pipe sections in the wellbore as part of the drill string;
    calculating a correction which is calculated based upon one or more physical characteristics of the drill string wherein, at least one of the physical characteristics is derived from measurements made at defined locations in the wellbore when the drill string is under tension whilst being pulled out of the wellbore; and
    applying the correction to the calibrated drill string length to obtain a value for a corrected drill string length as a measure of along hole depth.

2. A method as claimed in claim 1 wherein, the step of calculating the correction based upon physical characteristics of the drill string associated with the process of pulling the drill string out of the well, reduces the number of physical characteristics which affect the correction.

3. A method as claimed in claim 1 wherein, the drill string when being pulled upwards from a lower station to a higher station in the well bore is under tension.

4. A method as claimed in claim 1 wherein, the along-hole depth is measured with respect to a sub-surface so-called tie-in point or a surface reference point, or so called zero depth point (ZDP).

5. A method as claimed in claim 4 wherein, the ZDP is referenced to a reference point at or near the rig from which the drill pipe is being inserted into the hole.

6. A method as claimed in claim 1 wherein, the drill string is connected to a bottom hole assembly (BHA).

7. A method as claimed in claim 1 wherein, the measurements made at defined locations are made at a repeatable distance interval.

8. A method as claimed in claim 7 wherein, the defined locations are determined by the number of pipe sections contained within the drill string which define the length of drill pipe.

9. A method as claimed in claim 1 wherein, the one or more physical characteristic related to correction is thermal expansion in the drill string.

10. A method as claimed in claim 9 wherein the one or more physical characteristic is BHA temperature and BHA temperature values are measured by a temperature sensor.

11. A method as claimed in claim 10 wherein, the temperature sensor used for BHA temperature measurement is located on the bottom hole assembly as part of the measurement while drilling (MWD) sensor package or logging while drilling (LWD) sensor package.

12. A method as claimed in claim 1 wherein, the step of applying the correction to the calibrated drill string length comprises applying a correction for thermal expansion.

13. A method as claimed in claim 12 wherein, the thermal expansion is calculated using temperature values measured or estimated at a plurality of predetermined locations along the wellbore.

14. A method as claimed in claim 12 wherein, the thermal expansion is calculated by measuring the temperature of a plurality of the drill pipe sections and comparing these temperatures to the temperatures of the corresponding drill pipe sections prior to insertion of the drill pipe sections in the wellbore.

15. A method as claimed in claim 1 wherein, tension and temperature measurements may be obtained directly from the drill pipe when "wired pipe" is in use and either/or tension and temperature information is available along the length of the drill pipe.

16. A method as claimed in claim 3 wherein, station correction values of the correction are determined at a plurality of stations and a between stations correction values is determined, the total correction is a total of the station correction values and the between stations correction values.

17. A method as claimed in claim 1 wherein the one or more physical characteristic related to correction is elastic stretch in the drill string.

18. A method as claimed in claim 1 wherein, the step of calculating a correction comprises measuring the length of the drill pipe sections, in an un-stretched and relaxed state, or at a known and reported tension or compression, to provide a drill pipe section length prior to insertion of the drill pipe sections in the well.

19. A method as claimed in claim 18 wherein, surface weight of the drill string is measured.

20. A method as claimed in claim 19 wherein, the surface weight of the drill string is measured after drilling when the drill string is being pulled out of the hole (POOH).

21. A method as claimed in claim 19 wherein, the surface weight measurement is made while pulling the drill string out of the hole at a constant speed.

22. A method as claimed in claim 19 wherein, measurements of the surface weight of the drill string are used to create a plot of surface measured tension against drill pipe depth used to provide the correction factor.

23. A method as claimed in claim 19 wherein, the surface weight of the drill string ("surface hook load") is measured during a running in the hole (RIH) operation at measurement stations where the drill pipe is pulled out of hole at known and the same constant speed.

24. A method as claimed in claim 7 wherein, the repeatable distance includes a recording of the MWD and/or LWD sensors so that these can be correlated to the depth measurement value determined.

* * * * *